United States Patent
Navarro et al.

(10) Patent No.: US 9,063,835 B2
(45) Date of Patent: Jun. 23, 2015

(54) MANAGING PROCESSING OF USER REQUESTS AND DATA REPLICATION FOR A MASS STORAGE SYSTEM

(75) Inventors: Guillermo Navarro, Boise, ID (US); David Kiyoshi Umberger, Boise, ID (US); Milos Manic, Idaho Falls, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 13/981,907

(22) PCT Filed: Jun. 2, 2011

(86) PCT No.: PCT/US2011/038866
§ 371 (c)(1),
(2), (4) Date: Jul. 25, 2013

(87) PCT Pub. No.: WO2012/166141
PCT Pub. Date: Dec. 6, 2012

(65) Prior Publication Data
US 2013/0311729 A1    Nov. 21, 2013

(51) Int. Cl.
*G06F 3/06* (2006.01)
*G06F 12/00* (2006.01)
*G06F 11/34* (2006.01)
*G06F 11/16* (2006.01)

(52) U.S. Cl.
CPC ............ *G06F 12/00* (2013.01); *G06F 3/061* (2013.01); *G06F 3/065* (2013.01); *G06F 3/0659* (2013.01); *G06F 3/0689* (2013.01); *G06F 2206/1012* (2013.01); *G06F 11/1662* (2013.01); *G06F 11/3409* (2013.01)

(58) Field of Classification Search
CPC .................................................. G06F 3/0659
See application file for complete search history.

(56) References Cited

U.S. PATENT DOCUMENTS

| 6,487,562 B1 | 11/2002 | Mason, Jr. et al. |
| 7,246,211 B1 | 7/2007 | Beloussov et al. |
| 7,685,385 B1 | 3/2010 | Choudhary et al. |
| 2004/0205206 A1 | 10/2004 | Naik et al. |
| 2006/0095696 A1 | 5/2006 | Amano |
| 2006/0129771 A1* | 6/2006 | Dasgupta et al. ............. 711/162 |

(Continued)

OTHER PUBLICATIONS

ISR/WO, PCT/US2011/038866, HP reference 82678573, Feb. 9, 2012, 8 pps.

(Continued)

*Primary Examiner* — Idriss N Alrobaye
*Assistant Examiner* — Ronald Modo
(74) *Attorney, Agent, or Firm* — Trop, Pruner & Hu, P.C.

(57) ABSTRACT

A technique includes determining a workload on mass storage system that is associated will user requests during a time in which mass storage system is replicating data from a source data unit of the mass storage system to a replica storage unit of the mass storage system. The technique includes determining a progress rate associated with the replication and managing processing of the user requests and the data replication for the mass storage system, including initiating corrective action in response to determining that the workload is near a predetermined maximum workload threshold and the progress rate is near a predetermined minimum threshold.

15 Claims, 4 Drawing Sheets

(56) References Cited

U.S. PATENT DOCUMENTS

| | | | |
|---|---|---|---|
| 2006/0253621 A1 | 11/2006 | Brewer et al. | |
| 2007/0013948 A1* | 1/2007 | Bevan | 358/1.15 |
| 2010/0146566 A1 | 6/2010 | Taylor et al. | |
| 2010/0161900 A1 | 6/2010 | Satoyama et al. | |
| 2011/0167039 A1* | 7/2011 | Kol et al. | 707/633 |

OTHER PUBLICATIONS

Zheng, Weimin & Zhang, Guangyan, Tsinghua University, Fast Scale: Accelerate Raid Scaling by Minimizing Data Migration (Research Paper), https://db.usenix.org/events/fast11/tech/full_papers/Zheng.pdf, 13 pps.

* cited by examiner

MANAGING PROCESSING OF USER REQUESTS AND DATA REPLICATION FOR A MASS STORAGE SYSTEM

BACKGROUND

A traditional mass storage system offers a point-in-time recovery feature in which logical units (LUN) may be replicated. The LUN data replication typically occurs simultaneously with the servicing of user-initiated requests for read and write accesses with the mass storage system. The copying of relatively large data blocks from the source LUN typically introduces a background workload that significantly competes for system resources with the user workload and may significantly slow down the processing of user requests.

DETAILED DESCRIPTION

Figure 1:
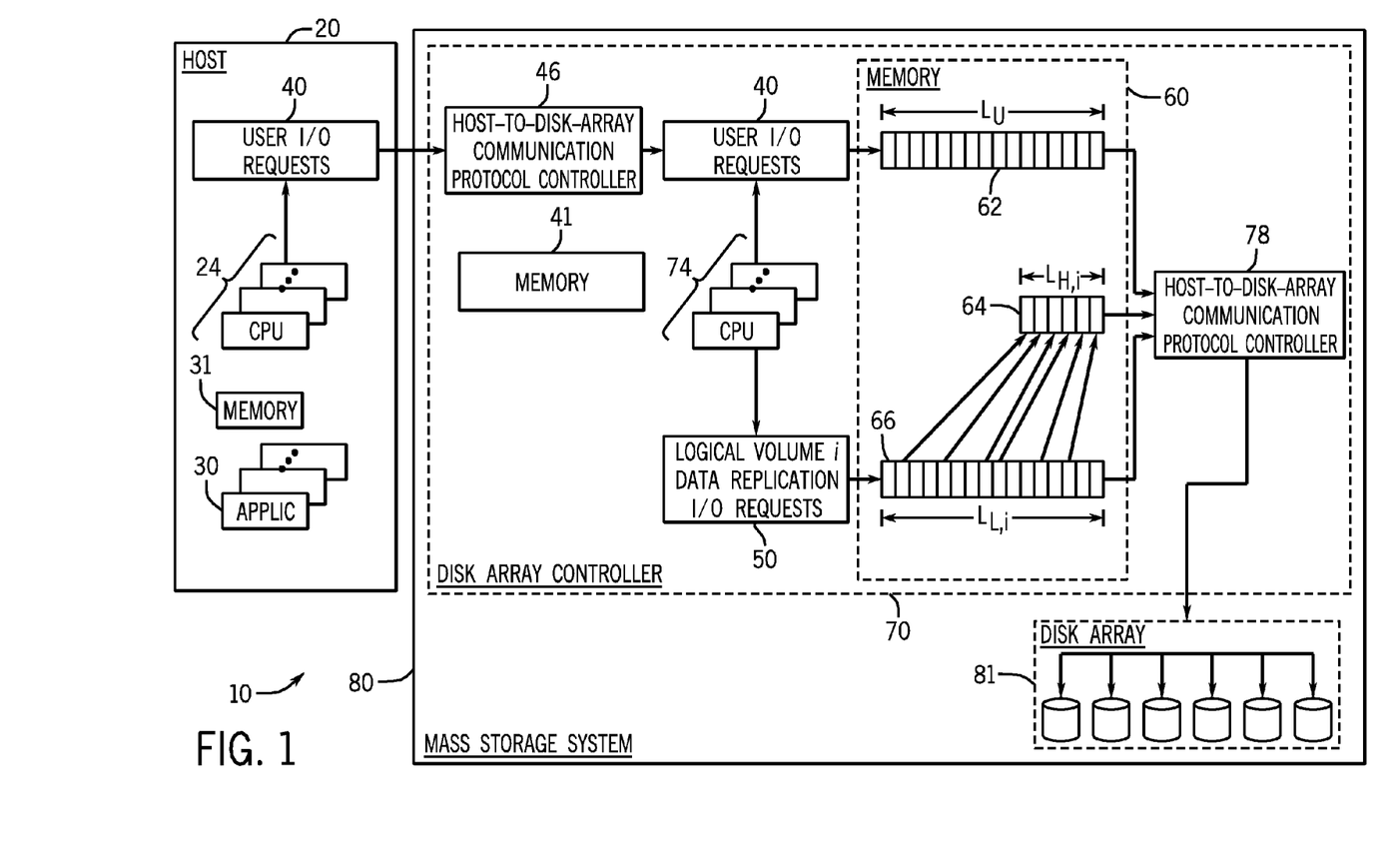
FIG. 1 is a schematic diagram of a computer system according to an Exemplary implementation.

Referring to FIG. 1, in accordance with exemplary implementations, systems and techniques are disclosed herein to manage access to a mass storage system for purposes of balancing the use of the mass storage resources between the use of the resources to service user requests and the use of the resources to perform data replication in the background. The system and techniques take into account the two ideal goals of data replication, which are mutually exclusive: 1.) no impact on the response time of the user accesses; 2.) fast data replication such that the data is protected as soon as possible, to permit the mass storage system to focus on servicing user accesses.

FIG. 1 depicts a computer system 10 in accordance with embodiments of the invention. As depicted in FIG. 1, the system 10 may include one or multiple physical machines, or hosts 20 (one host 20 being depicted in FIG. 1), which generate user initiated input/output (I/O) requests 40 for purposes of reading and writing data from and to a mass storage system 80. For the non-limiting example that is depicted in FIG. 1, the mass storage system 80 includes a mechanical disk drive array 81 and a disk array controller 70 (a redundant array of inexpensive disks (RAID)-based controller, as a non-limiting example), although other types of mass storage systems (a mass storage system using solid state drives, for example) are contemplated in accordance with other implementations.

In this context, a "physical machine" indicates that the machine is an actual machine made of actual program instructions and hardware. Examples of physical machines include computers (e.g., application servers, storage servers, web servers, etc.), communications modules (e.g., switches, routers, etc.) and other types of machines. A physical machine, such as the host 20, may be located within one cabinet (or rack); or alternatively, the physical machine may be located in multiple cabinets (or racks). In example implementations disclosed herein, the disk controller 70 manages access to the mass storage system 80 and balances the user (I/O) requests 40 with logical unit (LUN) data replication I/O requests 50, which are generated for purposes of replicating LUNs.

In accordance with a specific example disclosed herein, the host 20 contains machine executable program instructions and hardware that executes the instructions for purposes of generating the user I/O requests 40. The disk controller 70 generates the LUN data replication I/O requests 50. More specifically, in accordance with some implementations, the host 20 includes one or multiple central processing units (CPUs) 24, which execute machine executable program instructions in the form of one or more applications 30 for purposes of generating the user I/O requests 40. As a non-limiting example, the host 20 may store these machine executable instructions in a memory 31 of the host 20.

The disk controller 70 also includes one or multiple central processing units (CPUs) 74, which execute machine executable program instructions for the purposes of generating the LUN replication I/O requests 50 and for purposes of managing the processing of the user I/O requests 40 and the data replication, as described herein (such as in connection with techniques 100 and/or 200 that are further described below). As non-limiting example, these machine executable instructions may be stored in a memory 41 of the disk array controller 70. In other implementations, the disk array controller 70 may contain non-processor-based hardware or a combination of such hardware and the CPU(s) 74 to perform the management of the processing of the user I/O requests end the data replication, as disclosed herein. Thus, many variations are contemplated and are within the scope of the appended claims.

In general, the user I/O requests 40 and the LUN data replication I/O requests 50 are stored in a memory 60 of the disk array controller 70. As non-limiting examples, the memories that are disclosed herein, such as the memories 31, 41 and 60, may, in general be non-transitory memories, such as semiconductor storage memory, optical storage memory, magnetic storage memory, removable media memory, etc., depending on the particular implementation.

As shown in FIG. 1, the user I/O requests 40 are generated by the host 20 and sent to the disk array controller 70. The disk array controller 70 receives the user I/O requests 40 via a host-to-disk array communication protocol controller 46 that serves as an interface between the host 20 and the disk array controller 76. The user I/O requests 40 are received by the disk array controller 70 and are stored in a user queue 62; and the LUN data replication I/O requests 50 are stored in at least one replication queue. In the non-limiting particular example depicted in FIG. 1, the LUN data replication I/O requests 50 are stored in two queues: a first queue 66 for lower priority data replication requests; and a second queue 64 for relatively higher data replication requests. In general, the controller 70 retrieves the requests from the queues 62, 64 and 66 and processes these requests by sending the requests to the disk array 81 via a host-to-disk array communication protocol controller 78. The requests from the disk array controller 70 are processed for purposes of managing access to the mass storage 80 to balance the servicing of the user I/O requests 40 and LUN data replication I/O requests 50, as discussed herein.

In an exemplary implementation, the disk array controller 70 manages the lengths of the queues 62, 64 and 66 for purposes of balancing the workload associated with processing the LUN data replication I/O requests 50 and servicing the user I/O requests 40. In the following discussion, the user queue 62 has a length called, "$L_U$," the higher priority data replication queue 64 has a length called "$L_{H,i}$," and the lower priority data replication request queue 66 has a length called, "L.sub.L,i." As described herein, the controller 70 controls the lengths L.sub.U, L.sub.H,i and L.sub.L,i for purposes of balancing accesses for the user I/O requests 40 and LUN data replication I/O requests 50. There can be more than one LUN being replicated simultaneously by the mass storage 80. Each LUN uses a pair of higher (L.sub.H) and lower (L.sub.L) priority queues 64 and 66. For a set of n LUNs being replicated there are n pairs of priority queues 64 and 66, where i=1, 2, ... n. That is why the higher and lower priority queues are specified by the subscripts L.sub.H,i and L.sub.L,i.

In particular, in accordance with example implementations disclosed herein, the controller 70 implements a back off scheme to allow the mass storage 80 to fulfill the above-described two mutually exclusive goals of no impact being placed on the response time of the user accesses while allowing relatively fast data replication so that the data is protected as soon as possible to permit the mass storage 80 to focus on servicing the user accesses. This overload condition makes the user aware that the mass storage 80 is being saturated by the user workload and that the data replication is being stalled.

More specifically, in accordance with example implementations, the disk array controller 70 addresses three possible scenarios that may occur due to the computer system 10 concurrently processing user I/O requests 40 and LUN replication I/O requests 50. The first scenario occurs when the users are introducing a relatively light workload to the mass storage 80. In this scenario, the disk array controller 70 may increase the background replication workload to increase the rate of replication. The second scenario occurs when the users introduce a relatively heavy workload while the background data replication is being carried out at level above a desired minimum replication progress rate (as specified by user input). In this scenario, the disk array controller 70 decreases the background replication to free up more bandwidth to process the user I/O requests 40. The third scenario arises when the users introduce a relatively heavy workload, and the data replication is proceeding at or near the desired minimum replication progress rate.

As described herein, the disk array controller 70 identifies this later scenario as an overload condition. In general, the controller resolves the overload condition by either 1.) responding to user requests with a "back off" scheme, which throttles down the user workload on the mass storage 80; or 2.) reducing the replication progress rate below the desired minimum replication progress rate, even to the point of stopping, or halting, the replication altogether.

Figure 2:
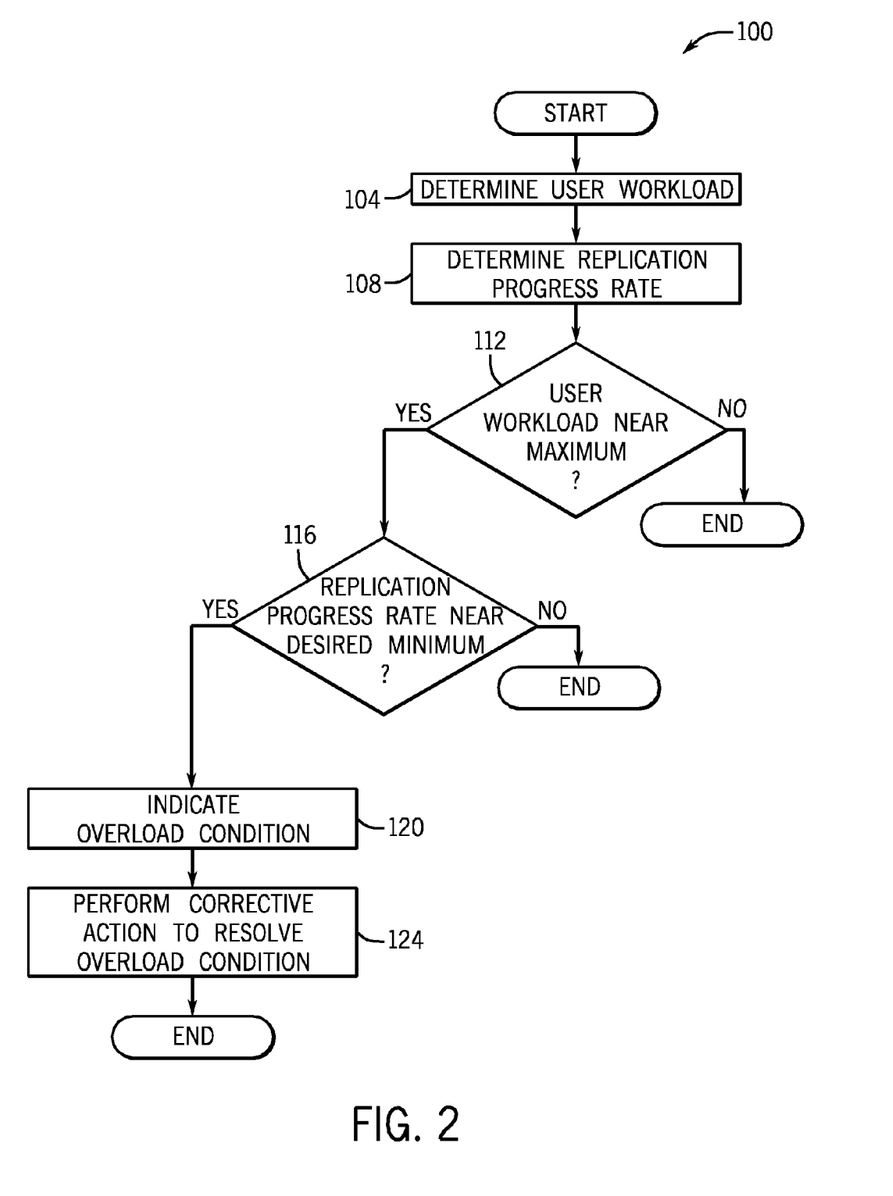
FIG. 2 is a flow diagram depicting a technique to identify and resolve an overload condition according to an exemplary implementation.

Referring to FIG. 2 in conjunction with FIG. 1, the disk array controller 70 thus, performs a technique 100 for purposes of identifying and resolving the above-described overload condition in accordance with some implementations. Pursuant to the technique 100, the disk array controller 70 determines (block 104) the user workload and determines (block 108) the replication progress rate. If the disk array controller 70 determines (diamond 112) that the user workload is near a maximum threshold and determines (diamond 116) that the replication progress rate is near the desired minimum replication progress rate, then the disk array controller 70 indicates (block 120) the overload condition. The disk array controller 70 then performs (block 124) corrective action to resolve the overload condition.

Referring back to FIG. 1, in accordance with some example implementations, the disk array controller 70 selectively regulates the rates at which the user I/O requests 40 and the LUN data replication I/O requests 50 are serviced by selectively regulating the lengths of the queues 62, 64 and 66. For the above-described first scenario, in which the users are applying a relatively light workload to the mass storage 80, the disk array controller 70 increases the throughput of the replication process by increasing the number of outstanding requests in the queue of replication requests. In other words, the controller 70 increases the lengths $L_{H,i}$ and $L_{L,i}$ of the queues 64 and 66.

For the above-described second scenario in which the users apply a relatively heavy workload while the background data replication is being carried out at a level above the minimum replication progress rate, the disk array controller 70 decreases the background replication to slow down the replication by decreasing the lengths $L_{H,i}$ and $L_{L,i}$ of the queues 64 and 66.

For the above-described third scenario, i.e., the overload condition, the disk array controller 70 may proceed in one of two ways. As described further below, in a first possible response, the disk array controller 70 initiates a back off scheme by communicating back of messages (SCSI busy responses, for example) in response to the user requests. For a second possible response, the disk array controller 70 further decreases the rate at which the LUN data I/O replication requests 50 are being processed (i.e., decreases the replication rate below the desired minimum replication progress rate) by decreasing the lengths $L_{H,i}$ and $L_{L,i}$ of the queues 64 and 66. In this second possible response, it can be noticed that by decreasing the length of the queues 64 and 66 down to zero (no requests in either queue 64 and 66) is tantamount to halting the replication process as no further replication request is processed since both queues 64 end 66 are empty (in mathematical terms the lengths are $L_{H,i}=0$ and $L_{L,i}=0$).

The above-described SCSI busy responses have the purpose to delay the processing of the user requests to aid the mass storage system 80 in catching up with the outstanding user 40 and LUN replication data 50 I/O requests. For the second-possible response to the overload condition, reducing the replication requests may cause the following. If while in the overload condition, a user writes to the LUN source, thereby causing a copy-on-write (CoW), then the controller 70 proceeds with a CoW or may decide to proceed with a redirect-on-write (RoW), thereby deferring the copy of the large data block from the source for later.

In accordance with some implementations, the user may select a parameter, called a data replication priority, for purposes of regulating how the controller 70 manages access to the storage 80. This parameter may have several values, depending on the particular implementation. As a non-limiting example, the parameter has two values: a low priority and a high priority. If the user desires a low priority replication, then the controller 70 favors servicing of the user I/O requests 40 over servicing of the LUN data replication I/O requests 50. With low priority replication, in the case of an overload condition, the controller 70 responds by throwing down the progress rate of the replicator below the desired minimum progress rate or alternatively, stopping, or halting, the replication altogether. When the user selects high priority replication, the controller 70 maintains at least the desired minimum progress rate (or above the minimum where possible) and responds with the back off scheme during the overload condition. With high priority replication, the minimum progress rate is maintained, even if the user response time is above the maximum threshold.

In the following non-limiting example, the following reference parameters are defined for purposes of desiring a control scheme to regulate access to the mass storage 80. A parameter called "$T_{max}$," is user selectable and represents the maximum acceptable user response time; and a parameter called "$X_{min}$," represents the desired minimum replication progress rate. Based on these reference parameters, the controller 70 regulates the $L_U$ length of the user request queue 62, the $L_{H,i}$ length of the higher priority data replication request queue 64 and the $L_{L,i}$ length of the lower priority data replication request queue 66. The controller 70 also selectively generates a busy parameter, which when set by the controller 70, indicates the busy condition to back off user requests.

For purposes of monitoring feedback regarding the servicing of the request, the controller 70 calculates the following output parameters, in accordance with some implementations: an average user response time, called "$T_{avg}$"; another parameter indicating a percentile of user requests below a maximum acceptable user response, called, "$T_{perc}$"; and an average progress rate (megabits per second, for example) called "$X_{avg}$."

Figure 3:
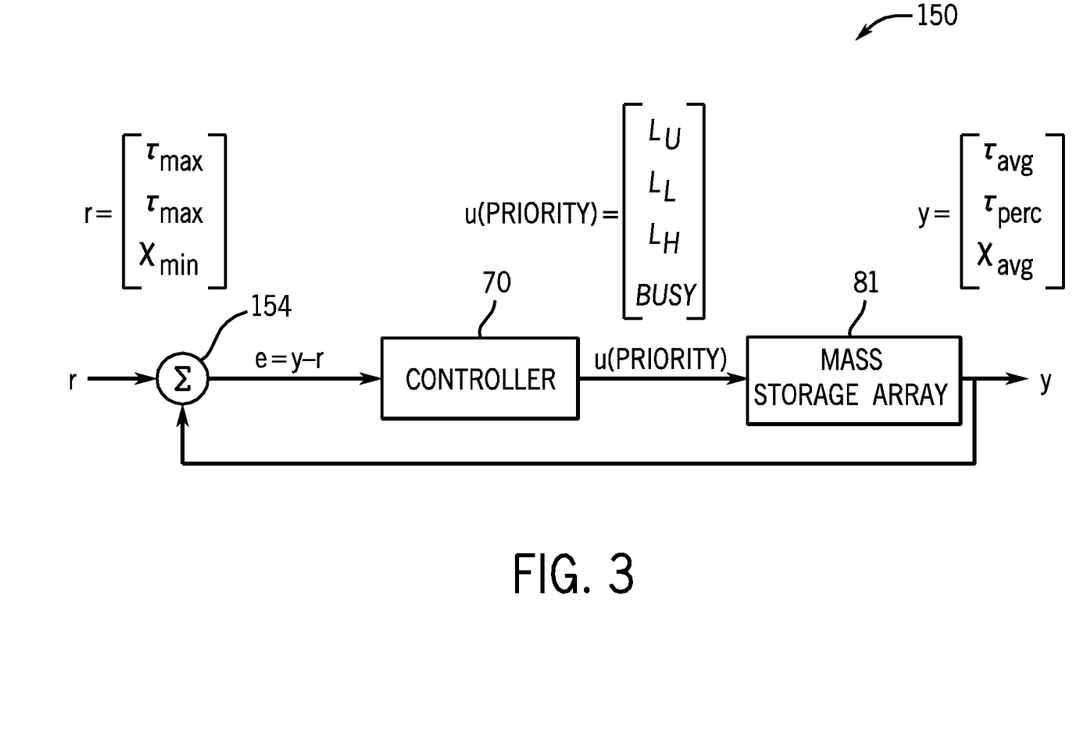
FIG. 3 is a control system for managing access to a mass storage system according to an exemplary implementation.

The above-described reference, control and output parameters may be implemented in a control system 150 via machine executable instructions executed by the controller 70, for example, which is depicted in FIG. 3. As shown, an adder 154 receives the $T_{max}$ and $X_{min}$ parameters and the $T_{avg}$, $T_{perc}$ and $X_{avg}$ output parameters to generate an error signal that is supplied to the controller 70. The controller 70 generates its corresponding $L_U$, $L_{H,i}$, $L_{L,i}$ and BUSY parameters to manage access to the mass storage 80.

Figure 4:
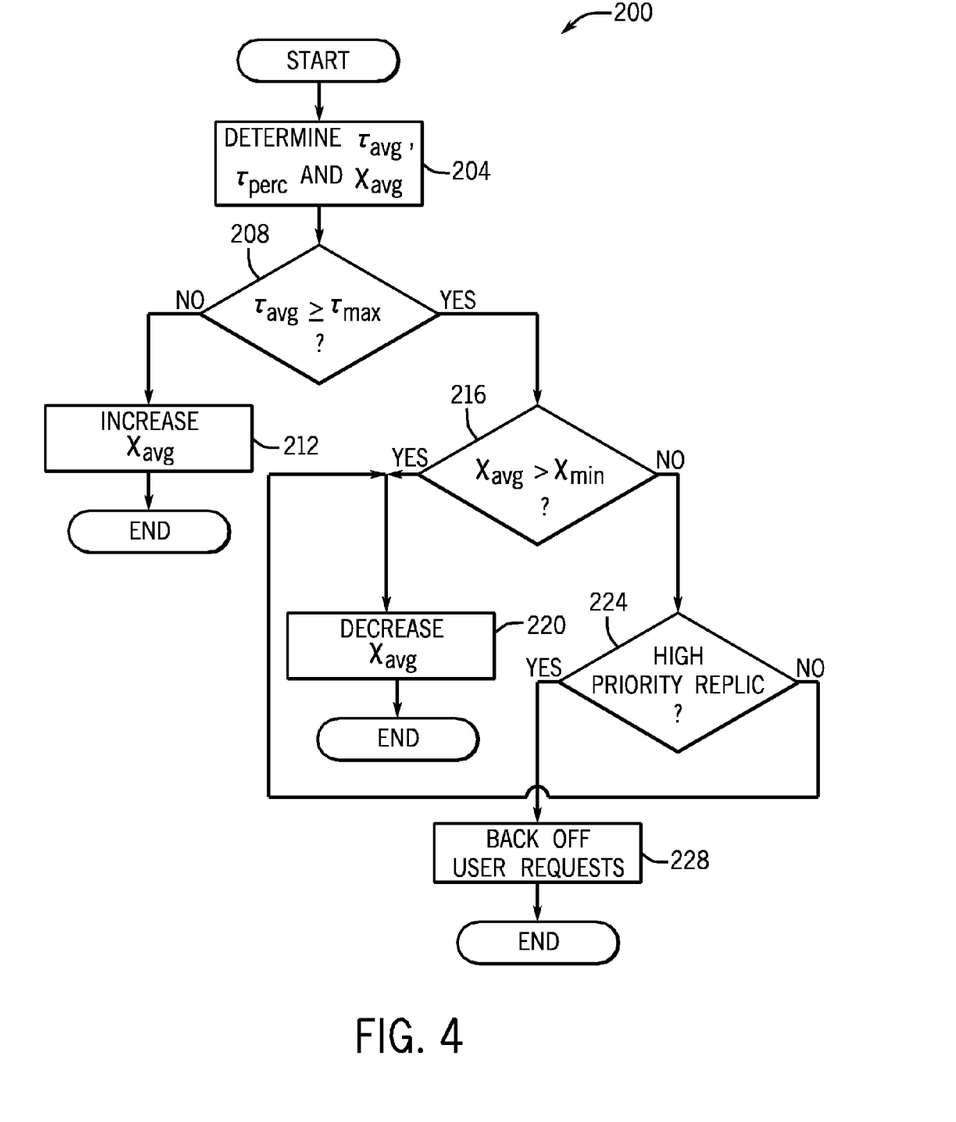
FIG. 4 is a flow diagram depicting a technique to manage access to a mass storage system according to an exemplary implementation.

Referring to FIG. 4 in conjunction with FIG. 1, to summarize, in accordance with example implementations, the controller 70 performs a technique 200 in accordance with some implementations. Pursuant to the technique 200, the controller 70 determines the $T_{avg}$, $T_{perc}$ and $X_{avg}$ output parameters and subsequently determines whether the average user response time is at or above the $T_{max}$ desired maximum time. In other words, the controller 70 determines (diamond 208) whether $T_{avg}$ is greater than or equal to $T_{max}$. If so, the controller 70 subsequently determines whether the average replication rate is above the desired minimum, i.e., determines (diamond 216) whether $X_{avg}$ is greater than $X_{min}$. If so, the controller 70 then decreases (block 220) $X_{avg}$. Otherwise, the average replication rate is equal to or below the $X_{min}$, the average response time is at or above $T_{max}$, and control proceeds to diamond 224 where the controller 70 determines (diamond 224) whether the user requests have been designated as being high priority. If so, the controller 70 responds to the overload condition by backing off (block 228) the user requests. Otherwise, the controller 70 responds to the overload condition by decreasing $X_{avg}$, pursuant to block 220.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    determining a workload on mass storage system associated with user requests during a time in which the mass storage system is replicating data from a source data unit of the mass storage system to a replica storage unit of the mass storage system;
    determining a progress rate associated with the replication; and
    managing processing of the user requests and the data replication for the mass storage system, comprising initiating corrective action in response to determining that the workload is near a predetermined maximum workload threshold and the progress rate is near a predetermined minimum threshold.

2. The method of claim 1, wherein the act of initiating corrective action comprises:
    selectively backing off the user requests.

3. The method of claim 1, wherein the act of initiating corrective action comprises:
    decreasing a workload on the mass storage system associated with the replication to reduce the progress rate below the minimum threshold.

4. The method of claim 1, wherein the act of initiating corrective action is based at least in part on priorities of replication requests associated with the replication of data.

5. The method of claim 1, further comprising:
    increasing a workload on the mass storage system associated with the replication in response to determining that the workload associated with the user requests is substantially below the predetermined maximum threshold.

6. The method of claim 1, further comprising:
    decreasing a workload on the mass storage system associated with the replication in response to determining that the workload associated with the user requests is near the predetermined maximum workload threshold and the progress rate is above the predetermined minimum threshold.

7. The method of claim 1, further comprising:
    the act of determining the workload associated with the user requests comprises determining an average user response time,
    the act of determining the progress rate associated with the replication comprises determining a an average progress rate, and
    the act of initiating the corrective action comprises selectively regulating a length of a queue that stores requests associated with the replication.

8. An article comprising at least one non-transitory machine-readable storage medium storing instructions that upon execution cause a system having at least one processor to perform a method according to claim 1.

9. A system comprising:
    a mass storage system to store data associated with user requests and data associated with an ongoing replication of data between a source data unit of the mass storage system and a replica data storage unit of the mass storage system; and
    a controller to manage processing of the user requests and the data replication for the mass storage system, the controller adapted to initiate corrective action in response to the controller determining that a workload on the mass storage system associated with the user requests is near a predetermined maximum workload threshold and a progress rate associated with the replication is near a predetermined minimum threshold.

10. The system of claim 9, wherein the controller is adapted to selectively back off user requests and decrease a workload on the mass storage system associated with the replication to reduce the progress rate below the minimum threshold.

11. The system of claim 10, wherein the controller is adapted to communicate a SCSI busy request to back off user requests.

12. The system of claim 9, wherein the controller is adapted to selectively regulate a queue length associated with replication requests to perform the corrective action.

13. The system of claim 9, wherein the controller is adapted to selectively regulate a queue length associated with replication to increase a workload on the mass storage system associated with the replication in response to determining that the workload associated with the user requests is substantially below the predetermined maximum threshold.

14. The system of claim 9, wherein the controller is adapted to selectively regulate a queue length associated with the replication to decrease a workload on the mass storage system associated with the replication in response to determining that the workload associated with the user requests is near the predetermined maximum workload threshold and the progress rate is above the predetermined minimum threshold.

15. The system of claim 9, further comprising:
   at least one replication request queue storing higher priority replication requests associated with a first queue length and lower priority replications requests associated with a second queue length; and
   a user request queue storing the user requests and associated with a third queue length,
   wherein the controller is adapted to:
      increase at least one of the first queue length and the second queue length in response to the controller determining that the workload associated with the user requests is substantially below the predetermined maximum threshold;
      decrease at least one of the first queue length and the second queue length in response, to the controller determining that the workload associated with the user requests is near the predetermined maximum workload threshold and the progress rate is above the predetermined minimum threshold;
   selectively back off user requests in response to the controller processing one of the higher priority replication requests and determining that the workload on the mass storage system associated with the user requests is near the predetermined maximum workload threshold and the progress rate associated with the replication is near the predetermined minimum threshold; and
   selectively decrease at least one of the first queue length and the second queue length in response to the controller processing one of the lower priority replication requests and determining that the workload on the mass storage system associated with the user requests is near the predetermined maximum workload threshold and the progress rate associated with the replication is near the predetermined minimum threshold.

\* \* \* \* \*

UNITED STATES PATENT AND TRADEMARK OFFICE
CERTIFICATE OF CORRECTION

| | | |
|---|---|---|
| PATENT NO. | : 9,063,835 B2 | Page 1 of 1 |
| APPLICATION NO. | : 13/981907 | |
| DATED | : June 23, 2015 | |
| INVENTOR(S) | : Guillermo Navarro et al. | |

It is certified that error appears in the above-identified patent and that said Letters Patent is hereby corrected as shown below:

In the claims,

In column 7, line 22, in Claim 15, delete "response," and insert -- response --, therefor.

Signed and Sealed this
Fifth Day of January, 2016

Michelle K. Lee
*Director of the United States Patent and Trademark Office*